United States Patent
Bhar et al.

(10) Patent No.: US 10,128,717 B2
(45) Date of Patent: Nov. 13, 2018

(54) RING FOR AN ELECTRIC MACHINE

(71) Applicant: General Electric Technology GmbH, Baden (CH)

(72) Inventors: Sayantan Bhar, Birr (CH); Janusz Bialik, Nussbaumen (CH); Henrik Overstam, Västerås (SE); Omed Rawandi, Västerås (SE)

(73) Assignee: General Electric Technology GmbH, Baden (DE)

( * ) Notice: Subject to any disclaimer, the term of this patent is extended or adjusted under 35 U.S.C. 154(b) by 162 days.

(21) Appl. No.: 15/210,247

(22) Filed: Jul. 14, 2016

(65) Prior Publication Data

US 2017/0025918 A1 Jan. 26, 2017

(30) Foreign Application Priority Data

Jul. 22, 2015 (EP) .................................... 15177903

(51) Int. Cl.
*H02K 5/20* (2006.01)
*H02K 3/51* (2006.01)
*H02K 3/24* (2006.01)

(52) U.S. Cl.
CPC ........ *H02K 3/51* (2013.01); *H02K 3/24* (2013.01)

(58) Field of Classification Search
CPC .. H02K 5/20; H02K 5/08; H02K 9/10; H02K 3/51; H02K 3/24
USPC .................................................. 310/260, 270
See application file for complete search history.

(56) References Cited

U.S. PATENT DOCUMENTS

| 4,547,688 | A  | * | 10/1985 | Hammer  | H02K 9/00 310/260 |
|---|---|---|---|---|---|
| 6,346,754 | B1 | * | 2/2002 | Kieda | H02K 3/24 310/270 |
| 6,459,180 | B1 | * | 10/2002 | Mori | H02K 3/24 174/15.6 |
| 6,952,070 | B1 | * | 10/2005 | Kaminski | H02K 3/24 310/270 |
| 2003/0025419 | A1 | * | 2/2003 | Leonov | H02K 3/51 310/208 |
| 2012/0098385 | A1 | * | 4/2012 | Jha | H02K 3/51 310/260 |
| 2012/0223608 | A1 | * | 9/2012 | Lexer | H02K 3/12 310/194 |

(Continued)

FOREIGN PATENT DOCUMENTS

EP    1 592 108 A2   11/2005
GB    1 542 116 A     3/1979

(Continued)

OTHER PUBLICATIONS

European Search Report for EP Application No. 15177903.0 dated Oct. 14, 2015.

*Primary Examiner* — Naishadh Desai
(74) *Attorney, Agent, or Firm* — Global Patent Operation; Rita D. Vacca

(57) ABSTRACT

The present disclosure relates to a ring for a rotor of an electric machine as a support for a retaining ring and for cooling coils of the rotor. It is an object of the invention to provide measures for cooling coils of a rotor of an electric machine. Disclosed is a ring for an electric machine, the ring is connected between a retaining ring and coils wound around a rotor, whereas the ring is fabricated from a non-conductive material.

7 Claims, 3 Drawing Sheets

(56) References Cited

U.S. PATENT DOCUMENTS

2012/0286614 A1* 11/2012 Draina .................... H02K 3/24
                                                                              310/180
2013/0221797 A1* 8/2013 Rigosu, Jr. ............... H02K 3/16
                                                                           310/261.1

FOREIGN PATENT DOCUMENTS

| JP | S 51 72702 U | | 6/1976 | |
|---|---|---|---|---|
| JP | 57078351 A | * | 5/1982 | ............... H02K 3/24 |
| JP | S 57 78351 A | | 5/1982 | |

* cited by examiner

RING FOR AN ELECTRIC MACHINE

CROSS-REFERENCE TO RELATED APPLICATIONS

This application claims priority to European Patent Application No. 15177903.0 filed Jul. 22, 2015, the contents of which are hereby incorporated in its entirety.

TECHNICAL FIELD

The present disclosure relates to a ring for a rotor of an electric machine as a support for a retaining ring and for cooling coils of the rotor.

The electric machine is in particular a rotating electric machine such as a synchronous generator to be connected to a gas or steam turbine (turbogenerator) or a synchronous generator to be connected to a hydro turbine (hydro generator) or an asynchronous generator or a synchronous or asynchronous electric motor or also other types of electric machines.

BACKGROUND

Such high power electric machines, as turbogenerators are cooled due to high heat generation in operation. In the following the concept of gaseous cooling of the rotor of the electric machine is disclosed, as an example cooling by medium air. In particular, the coils comprising windings wound around the rotor to induce a magnetic field in the rotor core are to be cooled or ventilated. To this end cooling paths are designed at the end of the coils along which the cooling gas flows. It may be advantageous to specify these coolings paths and enhance the cooling efficiency.

SUMMARY

It is an object of the invention to provide measures for cooling coils of a rotor of an electric machine.

This object is solved with the features of claim 1 and claim 7 according to the independent claims. The invention provides an efficient cooling to the coils of a rotor. The design of the ring with the material of glass fibre reduces the risk for cracks in the ring among others. This material further reduces the risk of relative movement between the ring and adjacent parts. Moreover, an earth fault is reduced when building the ring with non-conductive material, for example glass fibre. The slots have the shape of wedges regarding the radial cross-section of the ring having a deeper cavity at the outer end than at the inner end. These wedge shapes regulate the pressure of the gaseous cooling means along the slots Further examples of the invention are disclosed in the dependent claims.

Advantageously, slots are formed in the outer face of the ring in the axial direction of the rotor. These slots further define the cooling paths for the gaseous cooling means. The specific shapes of the slots reduce the risk of blockage of the ventilation. The ring becomes less sensitive to dirt and less sensitive to copper movement.

In a further example of the invention the slots have a rectangular shape and the slots are equidistant to each other. These measures ensure an equal flow of gaseous cooling means to the coils.

In another example of the invention ventilation holes are designed in the slots to transport a cooling medium from the outside of the ring to the inside of the ring to the coils or from the inside of the ring from the coils to the outside of the ring.

In a further example of the invention sheet layers are arranged between the ring and the coils for electrical insulation. These sheet layers have the main function of providing electrical insulation.

BRIEF DESCRIPTION OF THE DRAWINGS

Further characteristics and advantages will be more apparent from the description of a preferred but non-exclusive example of the ring, illustrated by way of non-limiting example in the accompanying drawings, in which.

DETAILED DESCRIPTION

Figure 1:
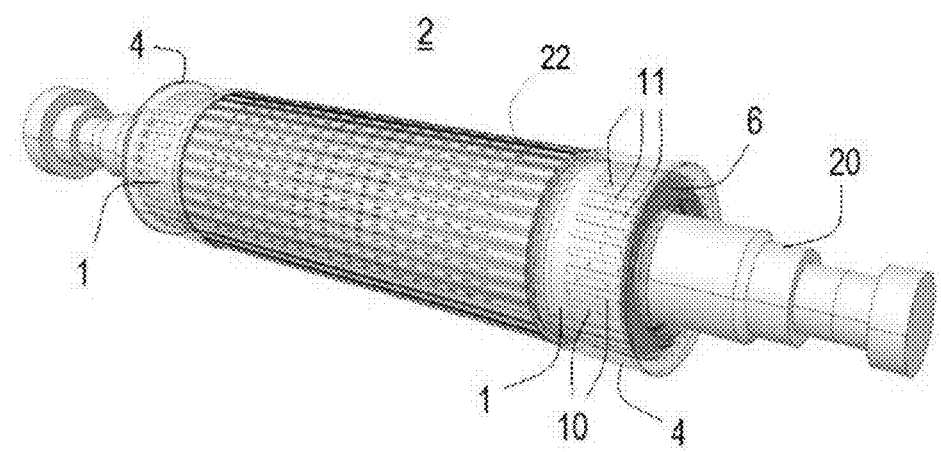
FIG. 1 shows a perspective view of a rotor of an electric machine with a shaft and coils wound around the rotor core, whereby a ring according to an example of the invention is arranged between the end of the coils and a retaining ring, for sake of illustration the retaining ring is transparent.

With reference to the figures, these show different views of examples of the ring 1, wherein like reference numerals designate identical or corresponding parts throughout the several views.

FIG. 1 shows a perspective view of a rotor 2 of an electric machine with a rotor shaft 20 or shaft 20, which is commonly driven by a coupled turbine (not shown) which drives the rotor 2 with a velocity of some thousand rounds per minute. Around main parts of the shaft 20 a compact rotor core 22 is built from solid magnetic forging. Within notches or slots 11 of the rotor core 22 coils 6 from copper are housed around the rotor core 22. These coils 6 or windings magnetize the rotor core 22 in operation. At each end section of the rotor 2 a retaining ring 4 is fixed which is shown here for sake of illustration as transparent. It is clear that the retaining ring 4 is commonly not transparent but built commonly from metal. Between the retaining ring 4 and the coils 6 the ring 1 is arranged which is fixed both to the retaining ring 4 and to the coils 6. The ring 1 is fabricated from a non-conductive material. The non-conductive material can be a material used as insulator in electric machines with proper mechanical properties for use in the rotor 2 exhibiting high rotation speeds of some thousand rounds per minute. The material of the ring 1 is chosen for minimum expansion with thermal heating of the rotor 2. This is one reason why the ring 1 is made from a non-conducting material. The ring 1 is designed at its surface with slots 11 projecting in the axial direction of the shaft 20. The slots 11 have an even distance between each other and have a rectangular shape regarded in the axial direction in this example. The slots 11 project from the outer end 13 in the direction to the inner end 14 in the direction of the centre of the shaft 20. The slots 11 do not project along the whole length of the ring 1 in this example. The slots 11 further contain ventilation holes 10 which project through the whole width of the ring 1 in the radial direction of the shaft 20. The ventilation holes 10 thus form ducts or passages in the ring 1 for a cooling medium to pass the ring 1, in particular gaseous means. The gaseous means passing the ventilation holes 10 mainly serves for cooling the coils 6 underneath the ring 1.

Figure 2:
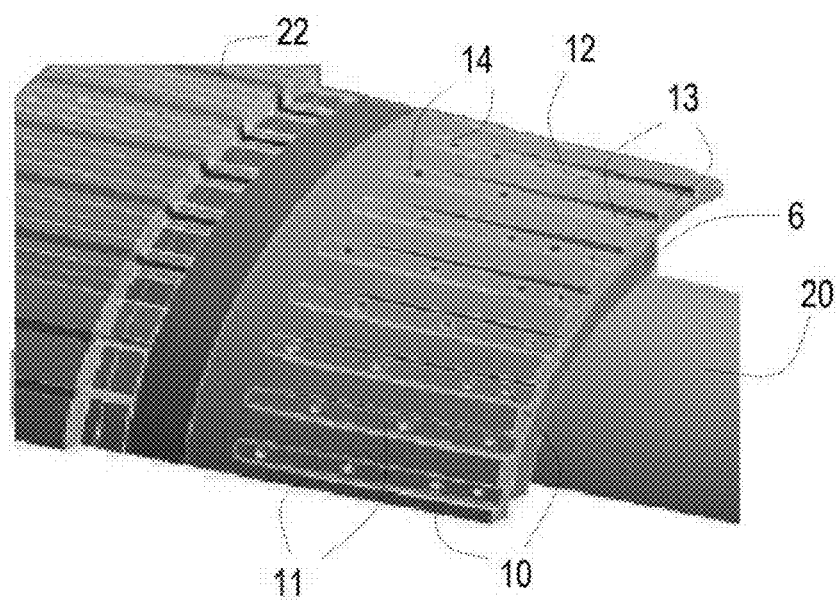
FIG. 2 shows a cut perspective view of a ring according to an example of the invention assembled at the shaft of a rotor and attached to the coil of the rotor and a retaining ring, with slots formed in the outer face of the ring in the axial direction of the rotor, and ventilation holes designed in the slots to transport a cooling medium from the outside of the ring to the inside of the ring to the coils.

FIG. 2 shows a cut perspective view of the ring 1 according to an example of the invention for an illustration in more detail. The cut perspective view shows a detail of FIG. 1, especially the surface of the ring 1. The ring 1 is assembled at the shaft 20 of the rotor 2 and attached to the coils 6 of the rotor 2 and the retaining ring 4. In FIG. 2 the shape of the slots 11 formed in the outer face of the ring 1 in the axial direction of the rotor 2 can be seen. The slots 11 have the shape of wedges regarding the tangential cross-section of the ring 1. With other words the slots 11 have a deeper cavity 12 at the outer end 13 than the cavity 12 at the inner end 14 of the slots 11. This means the cross-section of the ring 1 in the area of the slots 11 is smaller at the outer end 13. Also, the ventilation holes 10 designed in the slots 11 to transport air from the outside of the ring 1 to the inside of the ring 1 to the coils 6 or vice versa are shown.

Figure 3:
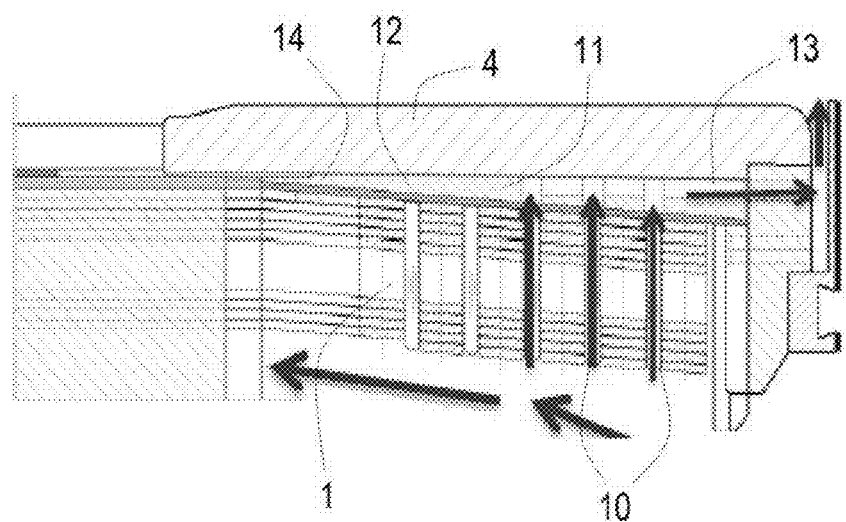
FIG. 3 shows a schematic cut side view of a ring according to an example of the invention below a retaining ring, with ventilation holes designed in the ring and arrows illustrating the direction of the cooling flow.

FIG. 3 shows a schematic cut side view of the ring 1 according to an example of the invention cut in the area of one of the slots 11. Above, a cut view of the retaining ring 4 is shown. Under the retaining ring 4 a cavity 12 is designed which has the shape of a wedge enlarging in the direction to the right which is the outer end 13. The cavity 12 illustrates one of the wedge shaped slots 11 as described under FIG. 2 above. Under the cavity 12 formed by one of the slots 11 the ring 1 is shown. At the left the rotor core 22 is connected to the ring 1. Further shown are the ventilation holes 10 designed through the ring 1 in a vertical direction through the whole breadth of the ring 1. The ventilation holes 10 have cylindric shapes in this example and are evenly distributed along the length of the ring 1. The arrows in FIG. 3 illustrate the direction of the cooling medium flow along the ring 1 and especially along the coils 6 to be cooled arranged at the rotor core 22.

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents.

The invention claimed is:

1. A ring for an electric machine, comprising:
    the ring, fabricated from a non-conductive material, connected between a retaining ring and coils wound around a rotor; and
    slots in the ring, wedge-shaped on radial cross-section of the ring, having a cavity deeper at outer ends of the slots than the cavity at inner ends of the slots.

2. The ring according to claim 1, wherein the non-conductive material is glass fibre.

3. The ring according to claim 1, wherein slots are formed in an outer face of the ring in an axial direction of the rotor.

4. The ring according to claim 3, wherein the slots have a rectangular shape on the outer face of the ring and the slots are equidistant to each other.

5. The ring according to claim 1, wherein the slots include ventilation holes to transport a cooling medium from an outside of the ring to an inside of the ring to the coils or from the inside of the ring from the coils to the outside of the ring.

6. The ring according to claim 1, wherein sheet layers are arranged between the ring and the coils for electrical insulation.

7. Use of a ring according to claim 1 for a rotor of an electric machine.

\* \* \* \* \*